(12) United States Patent
Smith

(10) Patent No.: US 6,533,985 B1
(45) Date of Patent: Mar. 18, 2003

(54) METHODS AND APPARATUS FOR MOLDING COMPOSITE MATERIALS

(75) Inventor: Lloyd V. Smith, Pullman, WA (US)

(73) Assignee: Washington State University Research Foundation, Pullman, WA (US)

( * ) Notice: Subject to any disclaimer, the term of this patent is extended or adjusted under 35 U.S.C. 154(b) by 0 days.

(21) Appl. No.: 09/957,808

(22) Filed: Sep. 21, 2001

Related U.S. Application Data

(60) Provisional application No. 60/234,860, filed on Sep. 22, 2000.

(51) Int. Cl.⁷ .................... B29C 43/12; B29C 70/44
(52) U.S. Cl. ............ 264/257; 264/258; 264/313; 264/314; 264/512
(58) Field of Search ............... 264/510, 511, 264/512, 102, 101, 257, 258, 313, 314

(56) References Cited

U.S. PATENT DOCUMENTS

| | | | |
|---|---|---|---|
| 3,776,683 A | 12/1973 | Putzer et al. | |
| 3,841,822 A | 10/1974 | Putzer et al. | |
| 3,998,422 A | 12/1976 | Putzer | |
| 4,027,723 A | 6/1977 | Maurino et al. | |
| 4,055,620 A | 10/1977 | Conrad | |
| 4,093,175 A | 6/1978 | Putzer et al. | |
| 4,268,475 A | * 5/1981 | Willmerding | 264/315 |
| 4,931,247 A | * 6/1990 | Yeh | 264/258 |
| 5,090,885 A | * 2/1992 | Stalin | 425/117 |
| 5,151,236 A | * 9/1992 | Azzara et al. | 264/257 |
| 5,339,574 A | 8/1994 | Downing | |
| 5,366,684 A | * 11/1994 | Corneau, Jr. | 264/510 |
| 5,664,373 A | 9/1997 | Downing | |
| 5,858,295 A | * 1/1999 | McDowell | 264/317 |

\* cited by examiner

*Primary Examiner*—Stefan Staicovici
(74) *Attorney, Agent, or Firm*—Klarquist Sparkman, LLP

(57) ABSTRACT

Apparatus according to a disclosed embodiment are provided for molding a unit of a second material onto an article made of a first material. An inflatable, flexible bladder is fluidly connectable to a source of a pressurized fluid, such as compressed air. The pressurized fluid is used to inflate the bladder such that, when the bladder is at least partially inflated with the fluid, the article may be pushed against the bladder to invert the bladder and cause the exterior surface of the bladder to form a mold around at least a portion of the article.

16 Claims, 1 Drawing Sheet

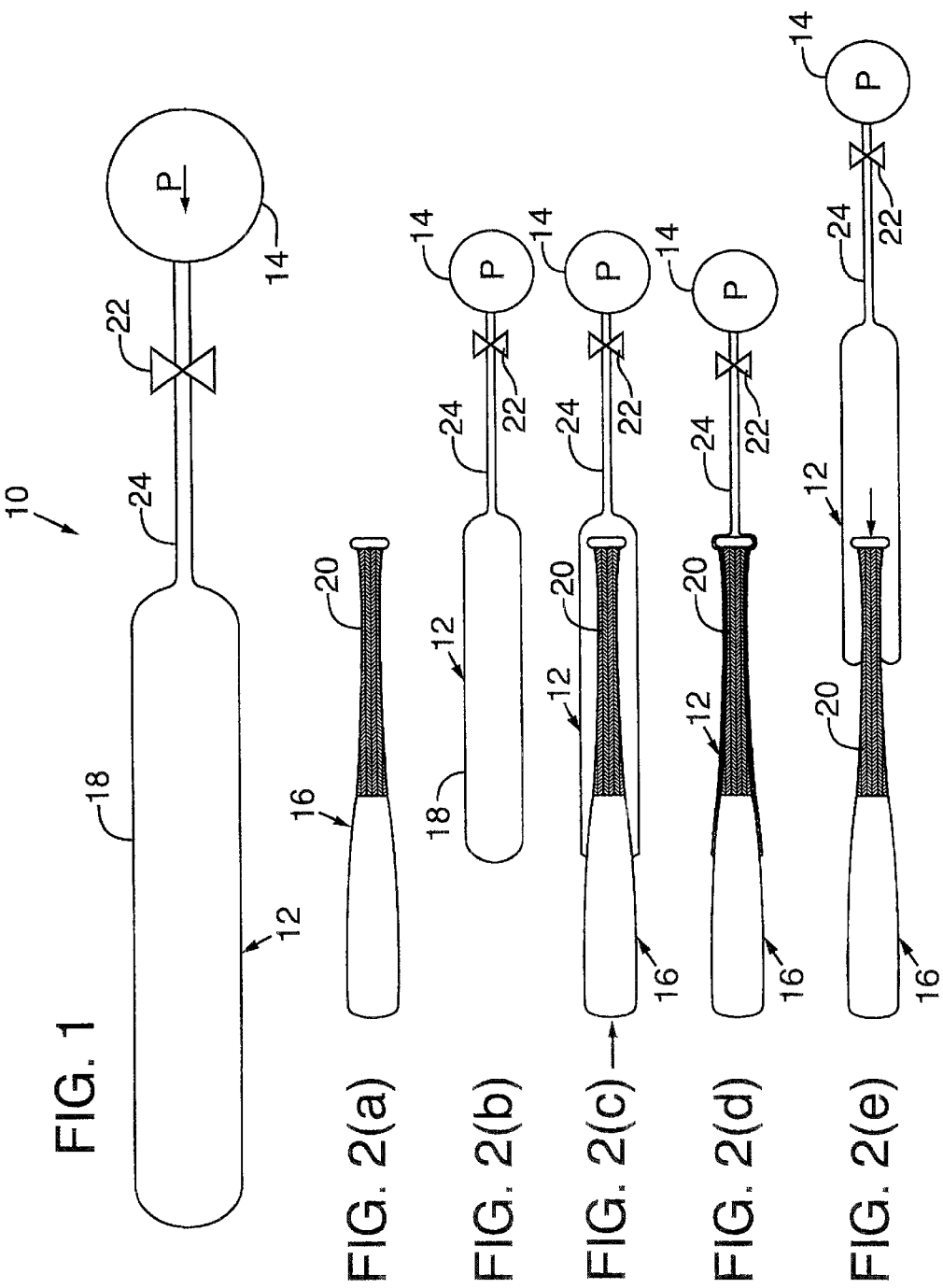

METHODS AND APPARATUS FOR MOLDING COMPOSITE MATERIALS

CROSS REFERENCE TO RELATED APPLICATION

The present application claims priority from prior pending U.S. provisional application No. 60/234,860, filed on Sep. 22, 2000, which is incorporated herein by reference.

FIELD

This invention relates generally to methods and apparatus for manufacturing composite articles. More particularly, this invention relates to flexible tooling apparatus and methods that utilize an inflatable balloon or bladder for molding articles made of a composite material, especially to conformably molding a second material to a rigid object formed of a first material so as to produce a composite article.

BACKGROUND

Composite materials are generally used in a wide variety of applications to increase the strength and durability of a part or article of manufacture. Use of composites has been represented extensively in many diverse applications such as aeronautics and sporting equipment. For example, composite materials recently have been investigated to increase the durability of a traditional wooden baseball bat.

The history of using composites in the manufacture of baseball bats is exemplary to the use of composites in general. Until the last 20 years, only solid wood was used to make baseball bats. Over the past few decades, however, numerous amateur leagues have allowed non-wooden bats made from aluminum and composites. While the initial intent of using a non-wooden bat was to increase durability, many non-wooden bats were designed to hit a ball further than otherwise would be accomplished using a solid-wood bat. This increased hitting performance is a cause of concern for some. The increased speed of a batted ball is believed to increase the risk of injury to players, while the increased hitting ability may provide an advantage to the batter, thus changing the traditional balance of defense and offense. These concerns, combined with the upward spiraling costs of some non-wooden bats, have led to renewed interest in wooden bats.

The configuration of a conventional wooden bat and the material properties of wood limit the use of traditional techniques for manufacturing a wood-composite bat. Generally speaking, composite parts are molded using either hard or flexible tooling. During molding, heat and pressure are applied to facilitate the curing of the molded material. When molding a composite layer applied to a wooden bat, however, heat may not be used to reduce cure time because wood has limited temperature resistance and exhibits high moisture expansion. Thus, a molding process for making a composite-reinforced wooden bat must operate at ambient temperatures.

Hard tooling involves the use of molds made of rigid materials. Rigid molds are expensive to fabricate and difficult to modify. A rigid mold also produces undesirable mold lines in the finished part, and generally can be used only with an article having a particular size and shape for which the mold was designed. Because, for example, there are a large number of commercially available bats of varying sizes, flexible tooling is preferable to hard tooling for applying a composite reinforcement material to wooden bats.

Flexible tooling incorporates a flexible mold comprised of an elastomeric material that can stretch and conform to a complex part geometry. Conventional flexible molding operations include "consolidation wrapping" and the use of a "tube-clave" device. A tube-clave comprises a rigid pipe having an internal tubular diaphragm connected to the pipe at each end of the pipe, thereby forming a sealed chamber between the diaphragm and the walls of the pipe. The interior cavity of the diaphragm constitutes the tube-clave. A vacuum applied to the chamber (between the diaphragm and the pipe walls) expands the diaphragm radially outward toward the pipe to allow an article (covered with a curable composite material) to be inserted into the tube-clave. Positive pressure is then applied to the chamber, forcing the diaphragm toward the article and providing consolidation of the composite material during cure. After the composite material is cured, a vacuum is re-applied to the chamber to allow the article to be removed from the tube-clave.

In some cases, tube-claves have proven to be unsatisfactory for curing a composite layer applied to the surface of an elongated article. For example, the diaphragm of a tube-clave is unable to adequately conform to the contour of an elongated article such as a bat having a diameter at an end that is substantially larger than the diameter of a middle portion such as the handle. In addition, tube-clave diaphragms have a limited useful life and need to be replaced frequently. As a result, a large number of tube-claves is necessary to effectuate an efficient manufacturing process.

In "consolidation wrapping," heat-shrink tape, strips of release cloth, or other wrapping material is applied to the surface of an article comprising a curable composite material to provide consolidation of the curable material during curing. Although the wrapping material conforms to the contour of an article better than a tube-clave, consolidation wrapping requires a high level of operator skill, and usually requires that the article be sanded or smoothed after removal of the wrapping material.

Therefore, there exists a need for new and improved apparatus and methods for manufacturing any of various articles having a composite material applied to a surface of the article.

SUMMARY

In view of the foregoing disadvantages inherent in conventional methods and apparatus used to manufacture composite articles, the present invention provides improved flexible tooling apparatus for molding a sleeve or analogous structure, made of a second material, to the surface of an article made of a first material so as to form a composite article, and molding methods that use such apparatus. The present invention also provides methods and apparatus for producing composite articles with reduced production costs and with a lower level of worker skill, and that optimize properties of the first and second materials by allowing proper curing of the material.

To such ends, and according to one aspect of the invention, an apparatus is provided for molding a unit of a second material onto an article made of a first material. An inflatable, flexible bladder is fluidly connectable to a source of a pressurized fluid, such as compressed air. The pressurized fluid is used to inflate the bladder such that, when the bladder is at least partially inflated with the fluid, the article may be pushed against the bladder to invert the bladder and cause the exterior surface of the bladder to form a flexible mold around at least a portion of the article. Desirably, the bladder is tubular in shape so as to longitudinally and circumferentially conform to the contour of the article during molding.

According to another aspect, a method is provided for molding an article made of composite material. In one specific embodiment, an inflatable, flexible bladder is at least partially inflated with a pressurized fluid. The article is urged against the inflated bladder sufficiently to invert the bladder around at least a portion of the article to form a pressurized mold around a surface of the article to be cured with the inflated portion of the bladder. Movement of the article relative to the bladder is restricted for a time sufficient to permit curing of the article. After completion of curing, the article is separated from the bladder.

According to another embodiment, a method is provided for molding a unit of a first material to the surface of a support structure. First, the first material is applied to the support structure in any conventional manner. A flexible bladder is inflated with a pressurized fluid. The structure is then urged against the inflated bladder sufficiently to invert the bladder around at least a portion of the structure to form a pressurized mold around a surface of the material. Movement of the structure relative to the bladder may be restricted to permit curing of the material in the bladder. After completion of curing, the structure is separated from the bladder and the cured material may be removed from the support structure. Alternatively, the structure may be removed from the bladder before the first material has cured, in which case the pressurized bladder is used to shape the first material to the surface of the support structure.

According to yet another embodiment, a method for molding an article comprising a composite material includes introducing a pressurized fluid into an inflatable bladder. The article is then urged against the bladder so as to invert the bladder substantially around the entire article and cause the bladder to form a pressurized mold around the article. A substantially equalized pressure exerted on the article by the bladder restricts movement of the article relative to the bladder as the composite material on the article cures. After curing is completed, the article is removed from the bladder.

These and other aspects and features of the invention are described below with reference to the accompanying drawings.

BRIEF DESCRIPTION OF THE DRAWINGS

FIG. 1 is a schematic side view of an apparatus for molding composite articles according to one embodiment.

FIGS. 2(a)–2(e) are schematic side views illustrating a molding process in which a composite sleeve is molded on a ball bat, as a representative article, using the apparatus of FIG. 1.

DETAILED DESCRIPTION

According to one aspect, flexible tooling apparatus are provided for making composite articles. As shown in FIG. 1, a representative embodiment of the apparatus 10 comprises an elongated, inflatable, flexible bladder 12 that is fluidly connectable to a pressurized fluid source 14. The pressurized fluid source 14 is operable to inflate the bladder 12. Any suitable pressurized fluid, such as compressed air or a liquid, from the source 14 may be used to inflate the bladder 12.

As will be described in detail below, the bladder 12 is sufficiently elastic or flexible so that it conformably forms a mold around the contour of an article, such as ball bat 16 in the illustrated example, as the article is urged against an inflated end 18 of the bladder. The bladder 12 is desirably tubular in shape so as to longitudinally and circumferentially conform to the contour of the article 16 during molding. As shown in FIG. 2(b), the diameter of an uninflated portion 24 of the bladder 12 desirably is approximately one half of the minimum diameter of the article 16 to be inserted into the apparatus. The bladder 12 may be made of any suitable material capable of withstanding exposure to the composite material, to the pressurizing fluid, and to curing conditions. For example, the bladder 12 may be made from any natural or synthetic elastomer. In one specific implementation, the bladder 12 is made from natural rubber.

By way of example, and not intending to be limiting in any way, the flexible tooling apparatus 10 can be used to mold a layer of a second material to the surface of an article made of a first material by a process referred to as "reverse-balloon molding." This process has particular applicability to molding a layer of composite material, that is, material typically comprising a fiber reinforcement lattice within a cured resin matrix, to the surface of an article. In the illustrated embodiment, for example, a composite sleeve 20 or analogous structure is molded on the outer surface of ball bat 16. The process, however, may be used to mold other types of materials. For example, the second material may comprise a thermoplastic material.

Referring to FIGS. 2(a)–2(e), the molding process may be described according to the following steps as performed on a bat as a representative article:

(a) As shown in FIG. 2(a), a "composite" layer 20 is applied to the handle portion of the bat 16 by any known method, such as wet filament winding or by applying a mat of composite material to the bat. The composite layer 20 is composed of a material, different from the bat material (wood) that, when bonded to the bat material, forms a "composite" structure.

(b) As shown in FIG. 2(b), the bladder 12 is at least partially inflated, as indicated at 18, by introducing a pressurized fluid from the source into the bladder 12. A valve 22 can be situated between the bladder 12 and the pressurized fluid source 14 to control pressure in the inflated portion 18, or the amount of inflation imparted to the bladder.

(c) As shown in FIG. 2(c), the bat 16 is urged against an end of the inflated portion 18 of the bladder 12 to cause the exterior surface of the bladder 12 to assume an inverted configuration and thus form a mold around the composite layer 20 on the bat 16. Alternatively, if the bladder 12 is sufficiently large, the bat 16 may be urged against the bladder 12 sufficiently to invert the bladder to an extent that forms a mold covering the entire surface of the bat (not shown).

(d) As shown in FIG. 2(d), the bladder 12 is deflated by withdrawing the pressurized fluid through the neck 24 so that the bladder 12 retains the bat 16 while exerting pressure radially inward toward the surface of the composite sleeve 20. Alternatively, rather than deflating the bladder 12 to retain the bat 16, the bat otherwise may be physically constrained from moving in a direction away from the bladder 12. If the bat 16 is totally enclosed by the bladder 12, as mentioned above, deflation of the bladder or constraint of the bat is not necessary to retain the bat 16 within the bladder 12, because the inward pressure from the bladder is substantially equalized about the entire surface of the bat. In any event, curing desirably is performed during this step. If desired, heat may be applied to the article to facilitate curing.

(e) As shown in FIG. 2(e), after the composite material 20 on the bat 16 has cured, the bat is removed from the bladder 12. Removal of the bat 16 may be accomplished either by removing the physical constraint used to restrict movement of the bat 16 in the bladder 12 or by re-inflating the bladder 12 if it had been deflated during the previous step. Otherwise, the bat 16 simply may be physically withdrawn from the bladder if the bladder had been used to completely surround the bat during molding.

This method of molding described above optimizes the properties of the composite material to provide the article with enhanced durability. Although the method is described in the context of producing a composite-reinforced wooden baseball bat (as a representative article), reverse-balloon molding may be used in the production of any of various articles (especially rotationally symmetrical articles) made entirely or partially of composite materials. Not intending to be limiting in any way, examples of other articles that may be manufactured according to any of the methods described herein include pressure vessels, hockey sticks, golf clubs, fishing rods, tubular framing (such as for bicycle frames), rowing oars and structural members (such as composite I-beams).

In addition, although the method of molding in the illustrated example is used to form a composite reinforced structure, the method also may be used to form an article made entirely of composite material, such as a full composite ball bat. In one approach, for example, composite material is applied to the surface of a support structure which defines the shape of the molded article. The support structure may be a mandrel, such as is used in wet filament winding. After molding the composite material according to the above-described method, the support structure is removed to form an article made only of composite material.

Apparatus and methods according to the present invention have a number of advantages over the traditional methods of molding composite articles. Since the methods do not involve rigid tooling and readily adapt to modifications in the geometry of the subject article, capital investment is minimized. The invention can also be used to fabricate composite articles having substantial curvature and thus are not suitable for use with a tube-clave.

Moreover, the present invention avoids the drawbacks inherent in consolidation wrapping. For example, the improved surface finish achieved by the invention eliminates the need for secondary sanding operations. In addition, the level of worker skill needed to use the invention is lower than that required for consolidation wrapping. Finally, process time achieved by the present invention is approximately half the time required to produce an article using consolidation wrapping.

Whereas the invention has been described in connection with a representative embodiment, it will be apparent that the invention is not limited to that embodiment. On the contrary, the invention is intended to encompass all modifications, alternatives, and equivalents as may be included within the spirit and scope of the invention, as defined by the appended claims.

I claim:

1. A method for shaping a material, the method comprising:
   (a) applying the material to the surface of a structure;
   (b) providing an inflatable, flexible bladder;
   (c) inflating the bladder with a pressurized fluid;
   (d) urging the structure against the inflated bladder sufficiently to invert the bladder around at least a portion of the structure to form a pressurized mold around a surface of the material to be shaped with the inflated portion of the bladder;
   (e) restricting movement of the structure relative to the bladder as the material is shaped; and
   (f) separating the structure from the bladder.

2. The method of claim 1, wherein step (e) comprises releasing pressurized fluid from the bladder so that the structure is retained by the bladder.

3. The method of claim 1, wherein steps (d) and (e) comprise urging the structure against the inflated bladder until the article is retained by the inflated bladder.

4. The method of claim 3, wherein steps (d) and (e) comprise urging the structure against the inflated bladder until the article is completely covered by the bladder and the article is retained by the bladder.

5. The method of claim 1, wherein step (f) comprises adding fluid to the bladder to cause the bladder to inflate and thus urge the structure out of the bladder.

6. The method of claim 1, wherein step (e) comprises physically constraining the structure from moving in a direction away from the bladder.

7. The method of claim 1, wherein step (e) comprises restricting movement of the structure relative to the bladder while the material cures in the bladder and step (f) comprises separating the structure from the bladder after the material has cured.

8. The method of claim 7, further comprising removing the cured material from the structure.

9. A method for molding an article comprising a composite material, the method comprising:
   providing an inflatable, flexible bladder;
   introducing a pressurized fluid into the bladder to form an at least partially inflated bladder;
   urging the article against the at least partially inflated bladder so as to invert the bladder around the article to be molded and cause the bladder to form a pressurized mold around the article such that a substantially equalized pressure exerted on the article restricts movement of the article relative to the bladder as the composite material on the article cures to form the molded article; and
   after curing is completed, removing the molded article from the bladder.

10. The method of claim 9, wherein the bladder is tubular in shape so as to longitudinally and circumferentially conform to the contour of the article during molding.

11. The method of claim 9, wherein the diameter of the bladder when not inflated is about one half the minimum diameter of the article to be molded.

12. A method of molding a layer of composite material to the surface of an article, the method comprising:
   applying the layer of composite material to the surface of the article;
   inflating a flexible bladder with a pressurized fluid to form at least a partially inflated bladder;
   urging the article against the at least partially inflated bladder sufficiently to invert the bladder around a surface of the composite material to form a pressurized mold around the surface of the composite material;
   restricting movement of the article relative to the bladder while the composite material cures; and
   removing the article from the bladder after the composite material has cured.

13. The method of claim 12, wherein restricting movement of the article relative to the bladder comprises releasing pressurized fluid from the bladder so that the article is retained by the bladder.

14. The method of claim 12, wherein the article is urged against the inflated bladder until a substantially equalized pressure exerted on the article restricts movement of the article relative to the bladder as the composite material on the article cures.

15. The method of claim 12, wherein removing the article from the bladder comprises adding fluid to the bladder to cause the bladder to inflate and thus urge the article out of the bladder.

16. The method of claim 12, wherein restricting movement of the article relative to the bladder comprises physically constraining the structure from moving in a direction away from the bladder.

* * * * *